United States Patent [19]
Gallery et al.

[11] Patent Number: 5,941,614
[45] Date of Patent: Aug. 24, 1999

[54] WHEELED VEHICLE

[75] Inventors: Michael John Gallery, Birmingham; Keith Reginald Parsons, Worcestershire; Paul Andrian Beever, West Midlands, all of United Kingdom

[73] Assignee: Rover Group Limited, Warwick, United Kingdom

[21] Appl. No.: 08/817,082

[22] PCT Filed: Sep. 28, 1995

[86] PCT No.: PCT/GB95/02298

§ 371 Date: Apr. 9, 1997

§ 102(e) Date: Apr. 9, 1997

[87] PCT Pub. No.: WO96/11826

PCT Pub. Date: Apr. 25, 1996

[30] Foreign Application Priority Data

Oct. 12, 1994 [GB] United Kingdom .................... 9420561

[51] Int. Cl.[6] ....................................................... B60T 8/00
[52] U.S. Cl. ........................................... 303/192; 180/170
[58] Field of Search ..................................... 303/192, 193, 303/125, 135, 121, 191, 199, 2–3; 180/179, 176, 170, 171, 175; 701/70, 93, 96, 22; 340/449; 192/4 A; 477/97, 92, 93, 901, 121

[56] References Cited

U.S. PATENT DOCUMENTS 3,584,214  6/1971  Peterson .
4,070,070  1/1978  Eggers .
4,867,288  9/1989  Simonyi et al. .
5,067,778  11/1991  Testardi .................................. 303/113
5,799,262  8/1998  Suzuki .................................. 180/179

FOREIGN PATENT DOCUMENTS

A 0336913   10/1989  European Pat. Off. .
0 429 066 A1  5/1991  European Pat. Off. .
A 0465993    1/1992  European Pat. Off. .
A 0532847    3/1993  European Pat. Off. .
2419242     10/1975  Germany .
A 3736807    5/1989  Germany .
1252155     11/1971  United Kingdom .
2152166      7/1985  United Kingdom .
WO 90/03898  4/1990  WIPO .

OTHER PUBLICATIONS

Patent Abstracts of Japan, vol. 10 No. 281 (M–250), Sep. 25, 1986 & JP,A,61 102336 (Mazda) May 21, 1986, with English Translation.
Patent Abstracts of Japan, vol. 13 No. 60 (M–796 Feb. 10, 1989 & JP,A,63 265754 (Fuji Heavy Ind.) Nov. 2, 1988.

*Primary Examiner*—Douglas C. Butler
*Attorney, Agent, or Firm*—Davis and Bujold

[57] ABSTRACT

A wheeled vehicle has brakes (14, 16, 17) controlled by an electronic control unit (22) and a hydraulic control system (20). A switch (32) can be used to cause the control unit to enter a hill descent control mode. In this mode the control unit controls the speed of the vehicle by keeping it at or below a threshold level to achieve controlled descent of a hill without the need for the driver to apply the brakes.

29 Claims, 2 Drawing Sheets

WHEELED VEHICLE

The invention relates to a wheeled vehicle having a braking system, and in particular to the use of the braking system to control the descent of hills by the vehicle. It is particularly useful for off-road vehicles.

When a wheeled vehicle such as a car is going down a steep slope, it is usual to put the car into a low gear and use engine braking to slow the vehicle. The speed of the vehicle will depend upon the gear selected and the steepness of the slope. As a result, the brakes may still need to be used from time to time if the slope becomes particularly steep. On very steep slopes engine braking may not be sufficient to allow a controlled descent. In an off road environment slopes are frequently far steeper than usually encountered and traction can be poor, particularly in wet or muddy conditions.

It is known from DT 24 19 242 to provide a braking system wherein the brakes are controlled so that the position of the brake pedal defines exactly the retardation which will be produced. However, such a system would not be effective in controlling the descent of a hill under conditions of poor traction because, as soon as traction is lost, the speed of the vehicle will change and the system will not be able to return it to a speed suitable for the conditions.

According to the present invention there is provided a wheeled vehicle having a plurality of wheels, a plurality of braking means each for braking one of said wheels, wheel lock detection means for detecting locking of any of said wheels, and control means which has activated and de-activated states, characterized in that in its activated state the control means is arranged to apply each braking means to slow the vehicle when a detected vehicle speed is above a predetermined constant threshold speed and no wheel locking is detected, but to release any of the braking means if locking of its respective wheel is detected while the detected vehicle speed is above said threshold speed.

Preferably, the control means, in its activated state, is arranged so that operation of an accelerator of the vehicle by a driver can accelerate the vehicle above the threshold vehicle speed.

Preferably the control means in its activated state is arranged to respond to operation of an accelerator of the vehicle by a driver by controlling the braking means to control the speed of the vehicle.

Preferably the control means is arranged to set a target vehicle speed, the value of which is controlled by operation of the accelerator, and to control the braking means so as to maintain the vehicle speed at the target speed.

Preferably, over at least the first part of travel of the accelerator, the target vehicle speed is increased with increased travel of the accelerator. This means that, when the target speed rises above the actual vehicle speed brake pressure is released and the vehicle is free to accelerate under the engine power output or the effect of gravity. In this way, if acceleration is required, the control means need not be de-activated for the accelerator to be used. This may be important if a dangerous situation arises while the control means is activated and acceleration is required.

Preferably the control means is arranged to control the rate of change of speed of the vehicle towards the threshold speed if the vehicle speed is substantially different from the threshold speed.

Preferably the control means is arranged, on entering its activated state, to compare the vehicle speed with the threshold vehicle speed and to control the braking means to bring the vehicle speed towards the threshold speed.

Preferably the control means in its activated state is arranged to be over-ridden by the operation of a braking demand means of the vehicle by a driver to increase the amount of braking over that provided by the control means to slow the vehicle below the threshold vehicle speed if no wheel lock is detected. Thus, where braking is required while the control means is activated, the control means need not be de-activated in order for the braking to take full effect.

Preferably, the control means in its activated state is arranged to release the braking means, at least partially, when the detected vehicle speed is below the threshold vehicle speed. The control means is preferably arranged to apply the braking means when the detected vehicle speed is below the threshold vehicle speed if necessary to ensure that the rate of acceleration of the vehicle is less than a limit value. In this way, the threshold speed can be attained after gentle acceleration without overshoot of the threshold speed, and a hill can be descended safely and with reasonable rapidity.

Preferably the detected vehicle speed is derived from at least one detected wheel speed. Preferably it is derived from the detected speeds of all of the wheels. However, it could be determined independently for each of the wheels. It is known in anti-lock brake systems to have wheel speed detectors, and these can be used to produce a wheel speed signal for each of the wheels. They can therefore be used to determine when one of the wheels has locked.

The control means may be activated by a manually operable switch.

An embodiment of the invention will now be described by way of example and with reference to the accompanying drawings, in which.

Figure 1:
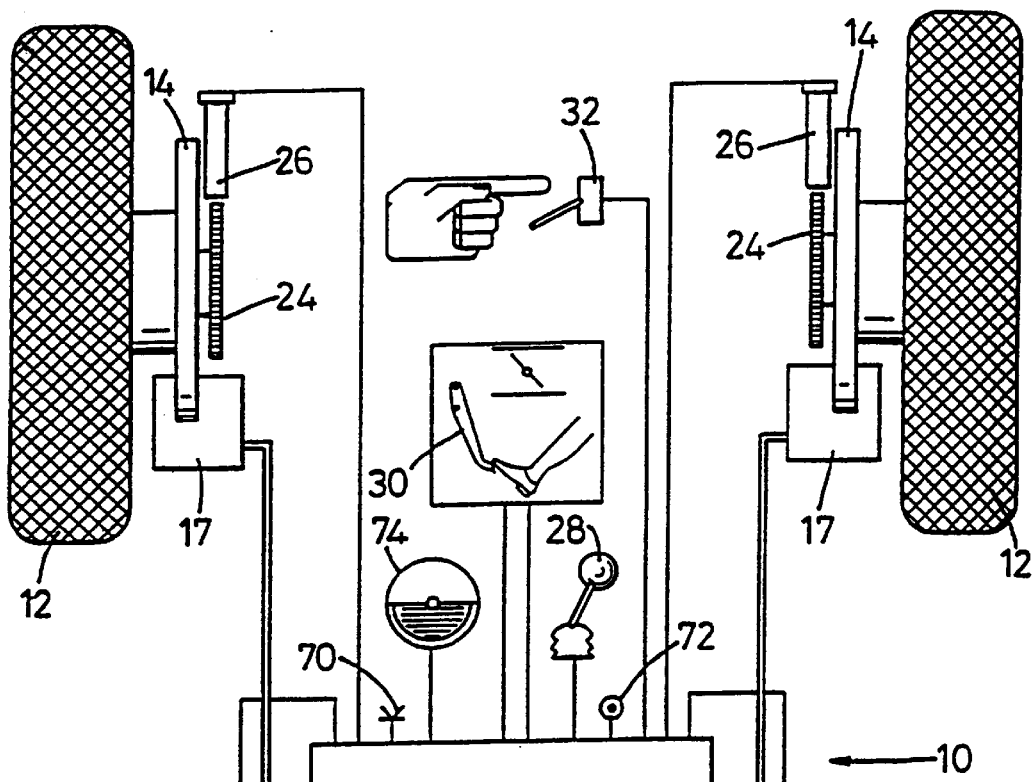
FIG. 1 is a schematic diagram of the vehicle of the embodiment.
Figure 1:
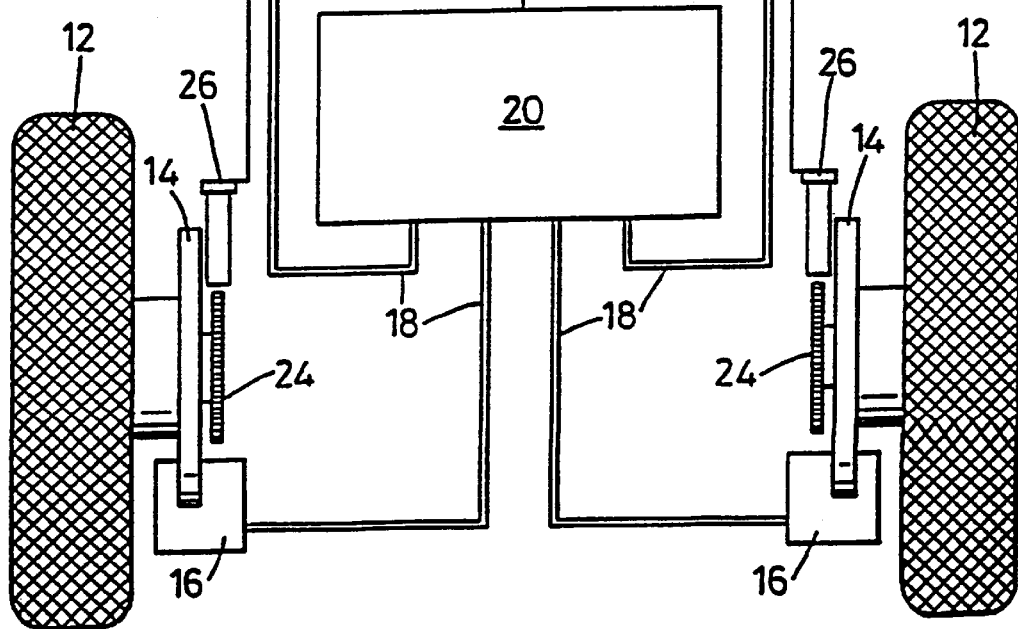

As shown in FIG. 1, the vehicle 10 includes four wheels 12. Each wheel 12 is provided with a co-rotating brake disc 14 which is acted upon by a brake calliper 16. The brake callipers 16 are hydraulically operated and a hydraulic line 18 leads from each brake calliper to a hydraulic brake control system 20. The hydraulic brake control system 20 is controlled by an electronic control unit 22.

Each wheel 12 also carries a co-rotating toothed wheel 24. An inductive sensor 26 is provided adjacent each toothed wheel 24 and provides a signal to the electronic control unit 22 in the form of a regular waveform voltage, the frequency of which is indicative of the wheel speed.

The gear lever 28 is also provided and a sensor is associated with the gear lever 28 and connected to the electronic control unit 22 to send a signal to the electronic control unit 22 when the vehicle is in first or reverse gear.

The accelerator pedal 30 has a continuously variable sensor in the form of a potentiometer associated with it which provides an analogue signal to the electronic control unit 22 which is dependent upon the position, or angle, of the accelerator pedal.

A manually operable switch 32 is also connected to the electronic control unit 22.

Figure 2:
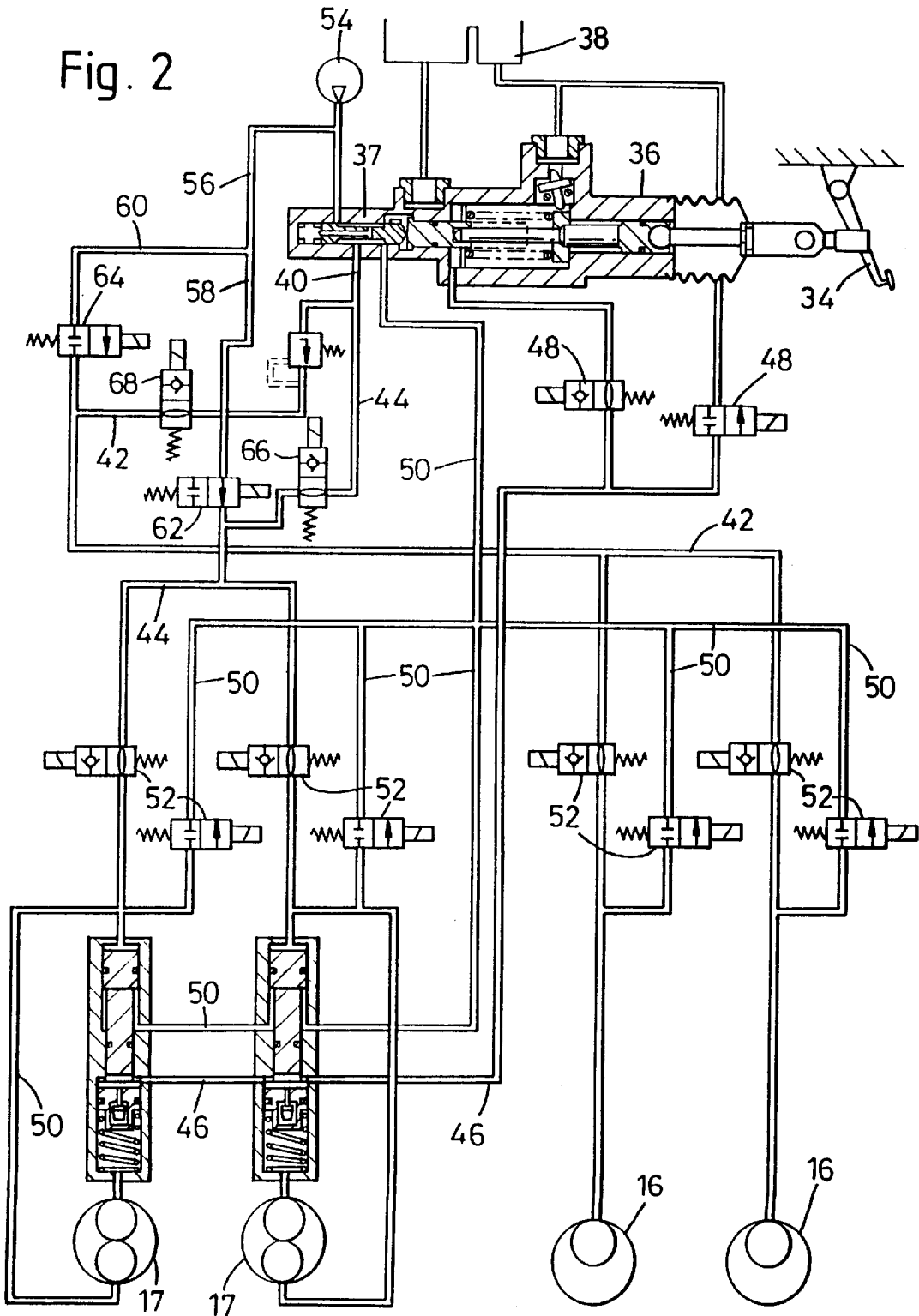
FIG. 2 is a diagram of the hydraulic system of the embodiment.

FIG. 2 shows the hydraulic braking system. The brake pedal 34 is connected to a hydraulic master cylinder 36. The master cylinder 36 is fed with hydraulic fluid from a reserve tank 38. An outlet line 40 from a valve 37 in the master cylinder 36 forks into rear and front pressure supply lines 42, 44. The rear pressure supply line 42 forks again to supply the rear brake callipers 16 on the left and right rear brakes, and the front pressure supply line 44 also forks again and supplies the left and right front brake callipers 17. A hydrostatic circuit 46 is provided which comprises a line from the front brakes 16 which forks and is connected to opposite sides of the master cylinder 36. Solenoid valves 48 are provided in each branch leading to the master cylinder 36.

Each of the brakes 16 is also connected by a feed/return line 50 to the master cylinder 36. The feed/return lines 50 combine to a single line into the master cylinder 36. A solenoid valve 52 is provided in each of the individual input and return lines 42,44,50. These eight valves 52 form part of the hydraulic control system 20 and are controlled by the electronic control unit 22 to perform an anti-lock braking function. The anti-lock function is arranged so as always to be in operation. They can therefore reduce the braking pressure to any of the wheels 12 to prevent wheel lock at any time.

The system further comprises a pump 54 which supplies brake fluid under pressure to the master cylinder valve 37 and to a pressure supply line 56. The supply line 56 branches into front and rear supply lines 58,60. The front supply line 58 is connected through a front supply valve 62 to front supply line 44. The rear supply line 60 is connected through a rear supply valve 64 to the rear supply line 42.

The front supply line 42 includes a supply/return valve 62 and the rear supply line 60 includes a supply/return valve 68. These valves can allow pressure to be supplied from the master cylinder valve 37 to the brake callipers, or can allow fluid pressure from the brake callipers to be relieved via the master cylinder valve 37. All of the valves 62, 64, 66, 68 form part of the hydraulic control system 20 and are controlled by the electronic control unit 22. They enable the control unit to control the brake pressure supplied from the pump 54 to the wheels independently of the movement of the master cylinder valve 37. They can therefore provide traction control and hill descent control as described in more detail below.

In use, the vehicle is driven normally when the switch 32 is switched off. Under these conditions the electronic control unit 22 operates the anti-lock valves 52 to prevent locking of the wheels if the driver brakes using the brake pedal 34. Also traction control is provided by the control unit 22 using the valves 62, 64, 66, 68. Both of these functions are carried out in known manner by monitoring the speed and acceleration of each wheel and a detected vehicle speed calculated from the speeds of all the wheels. The detected vehicle speed is calculated by using an average of all the wheel speeds, but ignoring the speeds of any wheels which are detected as locked or spinning. Locked wheels will be released by releasing braking pressure using the anti-lock valves 52, and spinning wheels will be slowed by applying a braking pressure from the pump 54 using the valves 62, 64.

When the activation switch 32 is switched on by the driver to select hill descent mode, the electronic control unit will check from the sensor associated with the gear lever 28 whether the engine is in first gear or reverse gear. If the engine is not in first gear or reverse gear, no action will be taken and the hill descent control will be suspended. If the engine is in first gear or reverse gear, the hill descent control will become active.

If the detected vehicle speed is above a predetermined threshold vehicle speed, the electronic control unit 22 will control the valves 62,64,66,68 as appropriate to control the braking applied by the brakes 16, 17 to bring the detected vehicle speed down to the threshold vehicle speed and keep it at that speed. This is done by increasing the braking force at a rate which varies with the amount by which the detected vehicle speed exceeds the threshold vehicle speed. Similarly, if the detected vehicle speed is below the threshold vehicle speed, the braking force is decreased at a rate which varies with the amount by which the detected vehicle speed is less than the threshold vehicle speed. Thus, if the vehicle is on a constant slope, the braking force will tend towards the amount required to keep the vehicle speed constant at the threshold vehicle speed. If the slope varies the amount of braking will increase or decrease accordingly to maintain the threshold vehicle speed. If the slope decreases enough the braking force will decrease smoothly to zero since no braking will be required to limit the vehicle speed.

The overall vehicle deceleration rate provided by the hill descent control is limited to a predetermined level of about 0.25 g. This is so that, during the period just following the selection of hill descent mode when the vehicle may be travelling at speeds substantially higher than the threshold speed, the deceleration to the threshold speed will be gentle and controlled. Similarly, the acceleration of the vehicle up to the threshold vehicle speed under the force of gravity, which is allowed by the control unit 22 releasing the brakes 16, 17, is limited to a predetermined value.

If in reducing the speed of the vehicle to the threshold speed, or maintaining it at that speed, a wheel locks, this will be sensed by the electronic control unit 22 as describe above. The valves 52 will be opened to reduce the braking force to the locked wheel under the control of the electronic control unit 22. This will produce an anti-lock function in a known manner. In order to prevent the locking of all the wheels on very slippery ground the anti-lock function will over-ride the hill descent control function so that a locked wheel will always be released.

The threshold vehicle speed will lie above a vehicle speed corresponding to engine idle speed and may be about 10 kph.

If, while the vehicle is in hill descent mode, the brake pedal 34 is applied so as to demand a greater amount of braking than is being provided by the electronic control unit 22, the hydraulic system is such that greater pressure will be applied to the brake and the action of the brake pedal thus cannot be overridden by the electronic control unit to reduce the amount of braking below that produced by the brake pedal.

If, while the vehicle is in hill descent mode, the control unit 22 detects that the accelerator 30 is depressed to demand greater acceleration or higher speed than is being provided by the electronic control unit 22 at that time, the braking system will be controlled as follows. Over the first part of the travel of the accelerator pedal 30, which may be about a quarter to a third of its full travel, the electronic control unit sets a target vehicle speed proportional to the amount of depression of the accelerator pedal 30. The control unit then controls the brakes 16, 17 so as to try to maintain the vehicle speed at the target speed. If the accelerator pedal is depressed far enough the target speed rises significantly above the speed at which the vehicle is travelling. The hill descent control will therefore not have any effect on the brakes and a smooth change over to normal operation is effected. In this way, the braking control is not suddenly released when the accelerator pedal is depressed.

In this way the vehicle 10 can slowly and safely negotiate a steep hill with no need for the driver to use the control pedals 30,34. Once at the bottom of the hill the manually operable switch 32 can be switched off to return to normal operation.

The vehicle 10 also includes a loudspeaker 70 which is arranged to emit an audible signal to a driver under the control of the electronic control unit 22. The audible signal will be emitted from the loudspeaker 70 when the manually operable switch 32 is switched on and the vehicle is put into first gear or reverse from a higher gear and the wheel speed is higher than the set threshold. The system will then act to slow the vehicle automatically unless over-ridden and the sound from the loudspeaker 70 will provide a warning that the vehicle will be automatically braked.

The vehicle 10 further includes an activation light 72 for the driver which indicates to the driver by different signals the following states: system enabled, system active, system faulty, and, system enabled but suspended (i.e. not in first gear or reverse).

By using the valves 66, 68 to reduce pressure when is necessary in a hill descent instead of ABS valves 52 it is made impossible for the hill descent control to reduce brake pressure below that brake pressure which may be present due to the driver pressing the brake pedal.

Additional sensors, such as one to three axis accelerometers (not shown), or an inclinometer 74 may be included in the system. These could be used to determine the steepness of the slope on which the vehicle was travelling, for example by subtracting the acceleration detected by the wheel speed sensors from the total acceleration detected by the inclinometer. This information could be used to alter the functioning of the hill descent control. For example the maximum possible deceleration could be reduced if the vehicle is descending a very steep slope. Also the threshold speed could be made dependent upon the steepness of the slope by decreasing with increasing slope.

It will be appreciated that controlled descent of hills can be provided in a similar manner to that describe above, in any system which has a means for increasing braking pressure, as is commonly required for traction control system, and an anti-lock brake system.

We claim:

1. A wheeled vehicle having a plurality of wheels, a plurality of braking means each for braking one of said wheels, wheel lock detection means for detecting locking of any of said wheels, vehicle speed detecting means for detecting the speed of the vehicle, a driver-operable accelerator and control means which has an activated state and a de-activated state;

wherein in the activated state the control means is arranged to apply each braking means to slow the vehicle when the vehicle speed detecting means detects that the vehicle speed is above a predetermined target speed and the wheel lock detection means detects no locking of the wheels, to release the braking means to accelerate the vehicle when the vehicle speed detecting means detects that the vehicle speed is below the predetermined target speed, and to release the braking means if locking of its respective wheel is detected while the detected vehicle speed is above said threshold speed, and to change the target speed in response to operation of the accelerator by a driver.

2. The vehicle according to claim 1 wherein the accelerator has a predetermined amount of travel and, over at least a part of said travel, the control means is arranged to increase the target vehicle speed with increased travel of the accelerator.

3. The vehicle according to claim 1 wherein the control means is arranged so that, if the vehicle speed detection means detects that the vehicle speed is substantially different from the threshold speed, the control means can control a rate of change of speed of the vehicle towards the threshold speed.

4. The vehicle according to claim 3 wherein the control means is arranged, on entering the activated state, to compare the detected vehicle speed with the threshold vehicle speed and to control the braking means to alter the vehicle speed towards the threshold speed.

5. The vehicle according to claim 4 wherein the control means is arranged to control the rate of acceleration of the vehicle towards the threshold speed if the detected vehicle speed is substantially lower than the threshold speed.

6. The vehicle according to claim 5 wherein the control means is arranged to control the rate of change of speed by limiting the rate of acceleration to a predetermined maximum value.

7. The vehicle according to claim 6 wherein the predetermined maximum value is in the range of about 0.2 to 0.3 times the rate of gravitational acceleration.

8. The vehicle according to claim 4 wherein the control means is arranged to control the rate of deceleration when the vehicle speed is substantially higher than the threshold speed.

9. The vehicle according to claim 1 further comprising gear selection means which can select one of a first gear and a reverse gear of the vehicle, and the activated state is only selectable if the vehicle is in one of said first and reverse gears.

10. The vehicle according to claim 1 further comprising driver-operable braking demand means operable to define a demanded level of braking, wherein the control means in the activated state is arranged to be over-ridden by operation of the braking demand means to increase the amount of braking to the demanded level to slow the vehicle below the threshold speed if wheel locking is undetected.

11. The vehicle according to claim 1 wherein the control means, in the activated state, is arranged to release the braking means at least partially when the detected vehicle speed is below the threshold value.

12. The vehicle according to claim 1 wherein the detected vehicle speed is derived from at least one detected wheel speed.

13. The vehicle according to claim 12 wherein the detected vehicle speed is derived from the detected speeds of all of the wheels.

14. The vehicle according to claim 1 further comprising a manually operable switch arranged to activate the control means.

15. The vehicle as claimed in claim 1 wherein the control means is arranged to provide traction control for the vehicle.

16. A brake control system for a wheeled vehicle having a plurality of wheels, a plurality of braking means each for braking one of said wheels, wheel lock detection means for detecting locking of any of said wheels and vehicle speed detection means for detecting the speed of the vehicle, the system comprising control means which has an activated state and a de-activated state;

wherein in the activated state the control means is arranged to apply each braking means to slow the vehicle when a detected vehicle speed is above a predetermined target speed and wheel locking is undetected, to release any of the braking means if locking of its respective wheel is detected while the detected vehicle speed is above said target speed, and to control a rate of change of speed of the vehicle towards the target speed if the vehicle speed is substantially different from the target speed.

17. The brake control system according to claim 16, wherein the control means is arranged, on entering the activated state, to compare the vehicle speed with the target speed and to control the braking means to bring the vehicle speed towards the target speed.

18. The brake control system according to claim 17, wherein the control the control means is arranged to control the rate of acceleration of the vehicle towards the target speed if the detected vehicle speed is substantially lower than the target speed.

19. The brake control system according to claim 17 wherein the control means is arranged to control the rate of acceleration of the vehicle towards the target speed if the vehicle speed is substantially higher than the target speed.

20. The brake control system according to claims 17, wherein said control of the rate of change of speed comprises limiting the rate of change of speed to a predetermined maximum value.

21. The brake control system according to claim 20, wherein the predetermined maximum value is in the range of about 0.2 to 0.3 times the rate of gravitational acceleration.

22. The brake control system according to claim 17, wherein the control means in the activated state is arranged to be overridden by the operation of a braking demand means of the vehicle by a driver to increase the amount of braking over that provided by the control means to slow the vehicle below the target speed if wheel lock is undetected.

23. The brake control system according to claim 17, wherein the control means in the activated state is arranged to release the braking means at least partially when the detected vehicle speed is below the target speed.

24. The brake control system according to claim 17, wherein the control means is arranged to apply the braking means when the detected vehicle speed is below the target speed if necessary to ensure that the rate of acceleration of the vehicle is less than a limit value.

25. The brake control system according to claim 16 in combination with a wheeled vehicle which comprises:

a frame supporting a plurality of wheels;

a plurality of braking means each for braking one of said wheels; and wheel lock detection means for detecting locking of any of said wheels.

26. A brake control system for a wheeled vehicle having a plurality of wheels, a plurality of braking means each for braking one of said wheels, wheel lock detection means for detecting locking of any of said wheels and vehicle speed detection means for detecting the speed of the vehicle, the system comprising control means which has an activated state and a de-activated state;

wherein in the activated state the control means is arranged to apply each braking means to slow the vehicle when a detected vehicle speed is above a predetermined target speed and wheel locking is undetected, but to release any of the braking means if locking of its respective wheel is detected while the detected vehicle speed is above said target speed, the system further comprises sensing means arranged to determine a steepness of a slope on which the vehicle is traveling and the control means is arranged to vary the target speed dependent on said steepness.

27. The brake control system according to claim 26 wherein the sensing means comprises an inclinometer.

28. The brake control system according to claim 27 wherein the sensing means further comprises wheel speed sensors and is arranged to determine the steepness of the slope by subtracting an acceleration detected by the wheel speed sensors from a total acceleration detected by the inclinometer.

29. The brake control system according to claim 26 in combination with a wheeled vehicle which comprises:

a frame supporting a plurality of wheels;

a plurality of braking means each for braking one of said wheels; and wheel lock detection means for detecting locking of any of said wheels.

* * * * *